(12) United States Patent
Luan et al.

(10) Patent No.: US 12,125,187 B2
(45) Date of Patent: Oct. 22, 2024

(54) ENHANCING INTERPOLATED THERMAL IMAGES

(71) Applicant: Hewlett-Packard Development Company, L.P., Spring, TX (US)

(72) Inventors: He Luan, Palo Alto, CA (US); Jun Zeng, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 177 days.

(21) Appl. No.: 17/611,284

(22) PCT Filed: Sep. 26, 2019

(86) PCT No.: PCT/US2019/053278
§ 371 (c)(1),
(2) Date: Nov. 15, 2021

(87) PCT Pub. No.: WO2021/061138
PCT Pub. Date: Apr. 1, 2021

(65) Prior Publication Data
US 2022/0215528 A1 Jul. 7, 2022

(51) Int. Cl.
*G06T 3/4007* (2024.01)
*B29C 64/393* (2017.01)
*G06T 7/00* (2017.01)
*B33Y 50/02* (2015.01)

(52) U.S. Cl.
CPC .......... *G06T 7/0004* (2013.01); *B29C 64/393* (2017.08); *G06T 3/4007* (2013.01); *B33Y 50/02* (2014.12); *G06T 2207/20081* (2013.01); *G06T 2207/20084* (2013.01); *G06T 2207/30144* (2013.01)

(58) Field of Classification Search
CPC ................ G06T 7/0004; G06T 3/4007; G06T 2207/20081; G06T 2207/20084; G06T 2207/30144; B29C 64/393; B33Y 50/02; G01N 25/72
USPC ....................................................... 382/141
See application file for complete search history.

(56) References Cited

U.S. PATENT DOCUMENTS

| 10,073,424 | B2 | 9/2018 | Lin et al. |
| 10,366,472 | B2 | 7/2019 | Lelescu et al. |
| 2016/0150976 | A1 | 6/2016 | Fang et al. |
| 2018/0169948 | A1* | 6/2018 | Coeck .................... B33Y 10/00 |

(Continued)

FOREIGN PATENT DOCUMENTS

| CN | 110009566 A | 7/2019 |
| WO | WO-2017219263 A1 | 12/2017 |
| WO | WO-2018194591 A1 | 10/2018 |

(Continued)

*Primary Examiner* — Stephen P Coleman
(74) *Attorney, Agent, or Firm* — Shook, Hardy & Bacon L.L.P.

(57) ABSTRACT

An example three-dimensional (3D) printer may include a camera to capture a low-resolution thermal image of a build material bed. The 3D printer may include an interpolation engine to generate an interpolated thermal image based on the low-resolution thermal image. The 3D printer may also include a correction engine to enhance fine details of the interpolated thermal image without distorting thermal values from portions of the interpolated thermal image without fine details to produce an enhanced thermal image.

14 Claims, 6 Drawing Sheets

(56) References Cited

U.S. PATENT DOCUMENTS

2018/0250774 A1  9/2018  Symeonidis et al.
2019/0126607 A1  5/2019  De Pena et al.

FOREIGN PATENT DOCUMENTS

WO  WO-2019078813 A1 *  4/2019  ............. B29C 64/10
WO  WO-2019117886 A1 *  6/2019  ......... B29C 35/0288

* cited by examiner

Generate an Interpolated Thermal Image Based on a Low-Resolution Thermal Image from a First Camera
302

Enhance the Interpolated Thermal Image Using a Machine Learning Model
304

Calculate a Loss Function Based on the Low-Resolution Thermal Image and a High-Resolution Thermal Image
306

Update the Machine Learning Model Based on the Loss Function
308

ENHANCING INTERPOLATED THERMAL IMAGES

BACKGROUND

Additive manufacturing is a technique to form three-dimensional (3D) objects by adding material until the object is formed. The material may be added by forming several layers of material with each layer stacked on top of the previous layer. Additive manufacturing is also referred to as 3D printing. Examples of 3D printing include melting a filament to form each layer of the 3D object (e.g., fused filament fabrication), curing a resin to form each layer of the 3D object (e.g., stereolithography), sintering, melting, or binding powder to form each layer of the 3D object (e.g., selective laser sintering or melting, multijet fusion, metal jet fusion, etc.), and binding sheets of material to form the 3D object (e.g., laminated object manufacturing, etc.).

BRIEF DESCRIPTION OF THE DRAWINGS

FIG. 3 is a flow diagram of an example method to interpolate and enhance thermal images.

DETAILED DESCRIPTION

In a 3D printer that produces an object layer-by-layer, a defect in any particular layer may cause printing of the 3D object to fail or may result in a 3D object unsuitable for its intended purpose. Accordingly, printing may be monitored to detect defects during printing. In an example, a 3D printer may include a thermal camera to capture images during printing, for example, of a build material bed. The thermal camera may also, or instead, improve modeling or simulations of the printing process, allow for post-print analysis of the print process, provide greater insight into test data for the 3D object or later detected defects, or the like.

In some examples, the 3D printer may include a low-resolution thermal camera to capture an image of each layer as it is formed on the build material bed. As used herein, the term "low-resolution" refers to something having a resolution lower than a desired resolution. The low-resolution thermal camera may have any resolution lower than that desired by a user. In an example, the low-resolution thermal camera may have a resolution lower than the resolution achievable by the 3D printer in the dimensions of the plane of the build material bed. The low-resolution thermal camera may have a resolution of 31×30 pixels, 80×60 pixels, or the like. The 3D printer may include a low-resolution thermal camera to reduce cost or because the camera may be more robust to the process conditions of the 3D printer.

Because of the low resolution of the thermal camera, thermal images from the camera may be of limited usefulness. For example, there may be limited benefit to adjusting or training simulations or models based on low-resolution thermal images. In addition, it may be difficult to detect anomalies or defects in the print process based on the low-resolution thermal images. The low-resolution images may be upsampled and interpolated to produce a high-resolution thermal image. As used herein, the term "high-resolution" refers to something having a resolution higher than a low resolution. The high-resolution thermal image may include undesirable gradients or interpolation artifacts that may similarly limit the usefulness of the high-resolution thermal images. The gradients or artifacts may be most prevalent in fine details of the high-resolution thermal images, which is where the high-resolution thermal images may provide the most benefit over the low-resolution thermal images. Thus, the high-resolution thermal images may benefit from having the undesirable gradients or interpolation artifacts removed.

Figure 1:
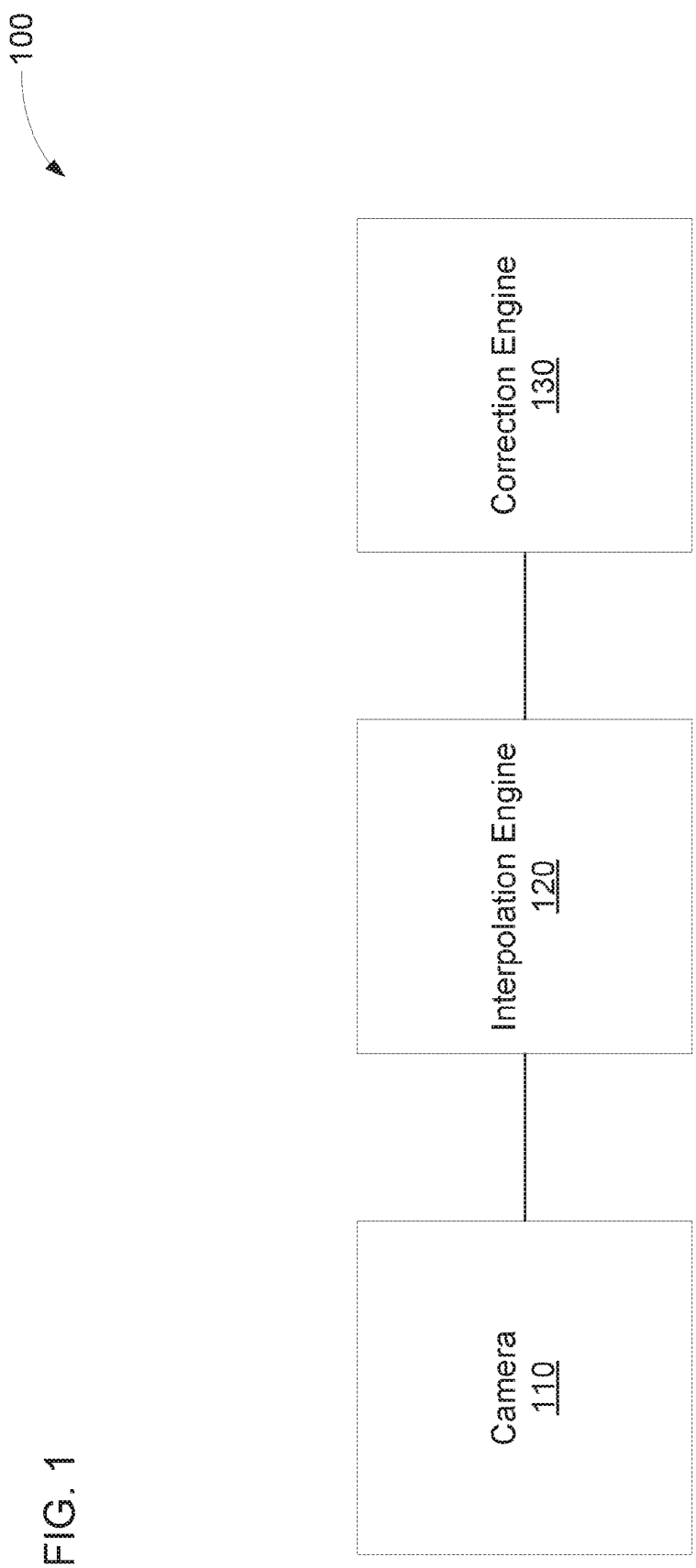
FIG. 1 is a block diagram of an example system to interpolate and enhance thermal images.

FIG. 1 is a block diagram of an example system 100 to interpolate and enhance thermal images. The system 100 may be or include a 3D printer. The system 100 may include a camera 110, an interpolation engine 120, and a correction engine 130. As used herein, the term "engine" refers to hardware (e.g., analog or digital circuitry, a processor, such as an integrated circuit, or other circuitry) or a combination of software (e.g., programming such as machine- or processor-executable instructions, commands, or code such as firmware, a device driver, programming, object code, etc.) and hardware. Hardware includes a hardware element with no software elements such as an application specific integrated circuit (ASIC), a Field Programmable Gate Array (FPGA), etc. A combination of hardware and software includes software hosted at hardware (e.g., a software module that is stored at a processor-readable memory such as random-access memory (RAM), a hard-disk or solid-state drive, resistive memory, or optical media such as a digital versatile disc (DVD), and/or executed or interpreted by a processor), or hardware and software hosted at hardware.

The camera 110 may capture a low-resolution thermal image of a build material bed. As used herein, the term "image" refers to an array of values or compressed information corresponding to an array of values regardless of whether those values are rendered. The camera 110 may be positioned in a 3D printer and may be oriented towards the build material bed. In some examples, the camera 110 may capture an image or a plurality of images for each new layer build material formed on the build material bed. The camera 110 may have a limited resolution, so the images captured by the camera 110 may be low-resolution thermal images.

The interpolation engine 120 may generate an interpolated thermal image based on the low-resolution thermal image. In some examples, the interpolation engine 120 may upsample and interpolate the low-resolution thermal image directly. In other examples, the interpolation engine 120 may upsample and interpolate an array of data or image other than the low-resolution thermal image, but the array of data or other image may be generated at least in part based on the low-resolution thermal image. The interpolation engine 120 may increase the pixel size of the array of data or image being interpolated and fill in missing values to upsample and interpolate the array of data or image.

The correction engine 130 may enhance fine details of the interpolated thermal image without distorting thermal values from portions of the interpolated thermal image without fine details to produce an enhanced thermal image. As used herein, the term "thermal values" refers to pixel values in a thermal image. The thermal values may correspond to the thermal state or temperature of the object imaged (e.g., grayscale values that correspond to the thermal state or temperature). As used herein, the term "fine details" refers to locations of the interpolated thermal image with large gradients. The fine details may include edges or features with sizes similar to or smaller than the resolution of the camera 110. The camera 110 may produce accurate temperature values for portions of the interpolated thermal image without fine details. Accordingly, the correction engine 130 may minimize changes to those portions of the interpolated thermal image. In contrast, the camera 110 may produce less accurate temperature values for the portions of the thermal image with fine details, and the portions with fine details may include undesirable gradients and interpolation artifacts that are not reflective of the actual state of the build material bed. The correction engine 130 may more aggressively enhance the portions with fine details to remove the undesirable gradients and interpolation artifacts and to produce an enhanced thermal image that more accurately reflects the actual state of the build material bed at locations corresponding to the portions with fine details.

Figure 2:
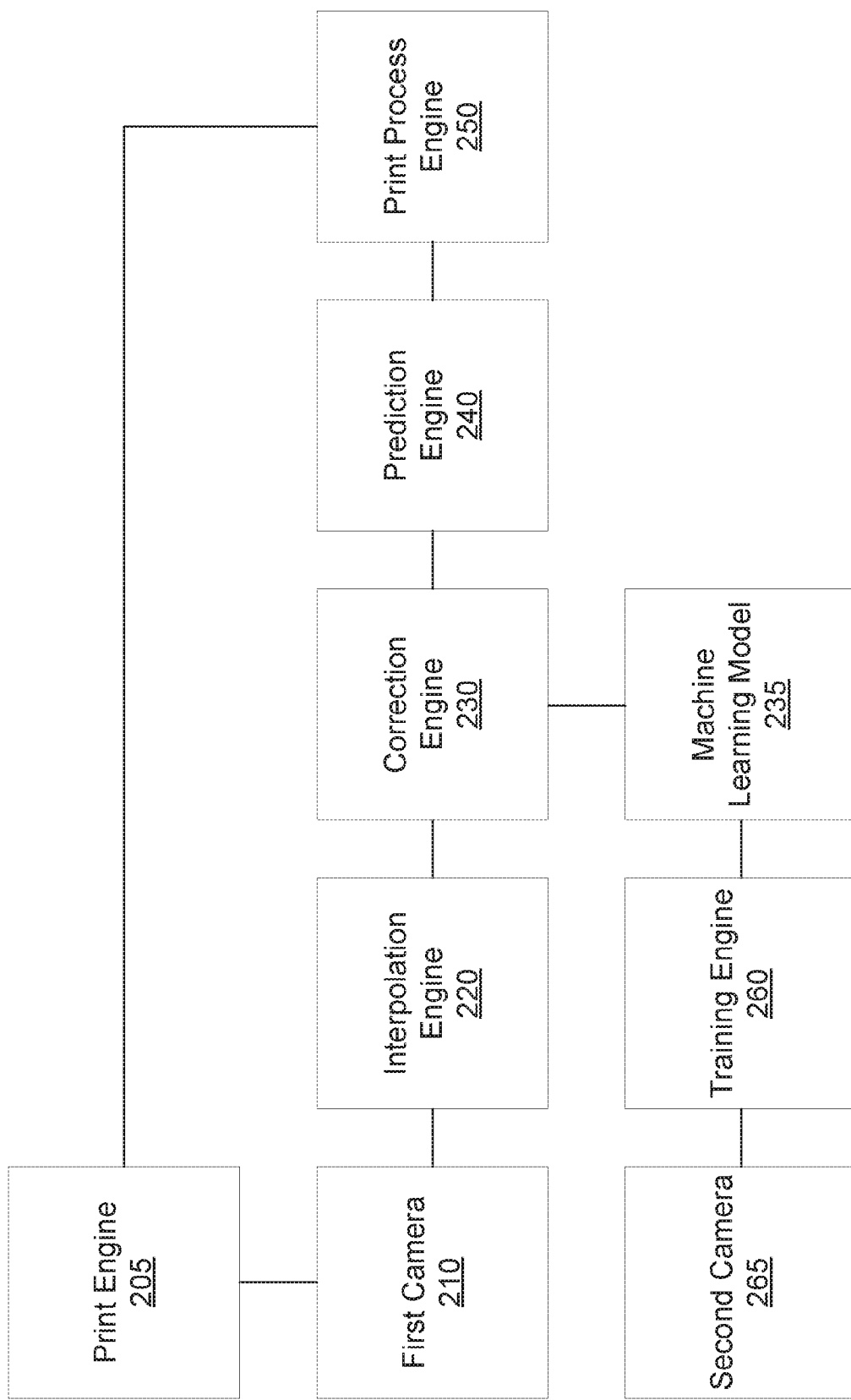
FIG. 2 is a block diagram of another example system to interpolate and enhance thermal images.

FIG. 2 is a block diagram of another example system 200 to interpolate and enhance thermal images. The system 200 may be or include a 3D printer. The system 200 may include a print engine 205, a first camera 210, an interpolation engine 220, a correction engine 230, a machine learning model 235, a prediction engine 240, a print process engine 250, a training engine 260, and a second camera 265. The print engine 205 may cause a printer to form a first layer of a 3D object on a build material bed. For example, the print engine 205 may cause the printer to spread a layer of build material on the build material bed. The print engine 205 may cause the printer to deliver energy to the build material bed to fuse locations on the build material bed. The fused locations may correspond to slices of a 3D object being formed by the printer. As used herein, the term "fuse" refers to attaching pieces of material to each other via sintering, melting, or binding with a binding agent. The print engine 205 may cause the printer to deliver a fusing agent, a binding agent, an inhibiting agent, a cooling agent, or the like to control which locations are fused. As used herein, the terms "first" and "second" are used to differentiate between items and do not imply an absolute location. For example, there may be layers before the first, between the first and second, or after the second.

The first camera 210 may capture a low-resolution thermal image of the build material bed. For example, the first camera 210 may be positioned in the printer with a view of the build material bed. In some examples, the first camera 210 may capture a low-resolution thermal image of each layer or multiple images of each layer. The first camera 210 may capture the low-resolution thermal image after energy has been delivered to the build material bed. Accordingly, the low-resolution thermal image may reflect the temperatures at various locations on the build material bed that resulted from the delivery of the energy. Alternatively, or in addition, the first camera 210 may capture low-resolution thermal images after spreading of the build material but before delivery of agents and energy, after delivery of agents but before delivery of energy, or the like.

The interpolation engine 220 may generate an interpolated thermal image based on the low-resolution thermal image. As with the interpolation engine 120 of FIG. 1, the interpolation engine 220 may directly generate the interpolated thermal image from the low-resolution thermal image, or the interpolation engine 220 upsample and interpolate an array of data or image generated based on the low-resolution thermal image. In some examples, the interpolation engine 220 may use other information in addition to the low-resolution thermal image to generate the interpolated thermal image. For example, the interpolation engine 220 may receive a shape image, and the interpolation engine 220 may generate the interpolated thermal image based on the low-resolution thermal image and the shape image. As used herein, the term "shape image" refers to an image that includes predetermined information about the target captured by the first camera 210. The shape image may include indications of intended locations of slices of objects in the build material bed, a contone map that indicates the amount of agent delivered to each location build material bed, or the like. The shape image may include information that can be used to produce an interpolated thermal image that more accurately reflects the state of the build material bed than when relying on the low-resolution thermal image alone.

In some examples, the interpolation engine 220 may generate a predicted thermal image based on a shape image. To generate the predicted thermal image, the interpolation engine 220 may modify the shape image to reflect a thermal image that might be expected to correspond to the shape image when taking physical phenomena, such as heat diffusion, into account. The interpolation engine 220 may use a simplistic model to generate the predicted thermal image to permit for efficient computation. The interpolation engine 220 may generate the interpolated thermal image based on the predicted thermal image. For example, the interpolation engine 220 may use information in the predicted thermal image and the low-resolution thermal image to generate the interpolated thermal image.

To generate the interpolated thermal image from the predicted thermal image and the low-resolution thermal image, the interpolation engine 220 may downsample the predicted thermal image to produce a downsampled predicted thermal image. The predicted thermal image may initially have a resolution that matches the desired resolution for the interpolated thermal image (although a higher or lower resolution is possible in some examples). The interpolation engine 220 may downsample the predicted thermal image to produce a downsampled predicted thermal image that has a resolution matching the resolution of the low-resolution thermal image. The interpolation engine 220 may calculate a ratio image based on a ratio of the downsampled predicted thermal image to the low-resolution thermal image. The interpolation engine 220 may calculate the ratio image by performing an elementwise division of the low-resolution thermal image by the downsampled predicted thermal image (e.g., each pixel of the ratio image may be computed by dividing a corresponding pixel in the low-resolution thermal image by a corresponding pixel in the downsampled predicted thermal image).

In some examples, the interpolation engine 220 may generate the ratio image directly from the shape image rather than generating a predicted thermal image. For example, the interpolation engine may downsample the shape image to produce a downsampled shape image (e.g., with a resolution matching that of the low-resolution thermal image). The interpolation engine 220 may calculate the ratio image based on a ratio of the downsampled shape image to the low-resolution thermal image. For example, the interpolation engine 220 may perform an elementwise division between the downsampled shape image and the low-resolution thermal image to produce the ratio image.

The interpolation engine 220 may interpolate the ratio image to produce an interpolated ratio image. The interpolation engine 220 may interpolate the ratio image by upsampling the ratio image to a resolution matching the desired resolution for the interpolated thermal image (e.g., the resolution of the predicted thermal image). The interpolation engine 220 may use interpolation (e.g., bicubic interpolation) to compute the values for the elements lacking values after the upsampling. The interpolation engine 220 may multiply the interpolated ratio image by the predicted thermal image or the shape image (e.g., whichever was used to generate the ratio image) to produce the interpolated thermal image. For example, the interpolation engine 220 may perform an elementwise multiplication of the interpolated thermal image by the predicted thermal image or the shape image to compute the interpolated thermal image. Interpolating the ratio image and multiplying it by the predicted thermal image or the shape image may prevent the interpolation process or the use of the predicted thermal image or the shape image from distorting thermal values from the low-resolution thermal image.

The correction engine 230 may enhance fine details of the interpolated thermal image without distorting thermal values from portions of the interpolated thermal image without fine details to produce an enhanced thermal image. As with the correction engine 130 of FIG. 1, the correction engine 230 may minimize changes to portions of the interpolated thermal image that accurately reflect temperature information captured by the first camera 210, but the correction engine 230 may correct portions where the temperature information captured by the first camera 210 is less accurate or that include undesirable gradients and interpolation artifacts not reflective of the actual state of the build material bed. In some examples, the correction engine 230 may enhance the fine details using a machine learning model 235 trained to enhance the fine details without distorting the other portions of the interpolated thermal image. As used herein, the term "machine learning model" refers to data usable to implement a trained machine learning device using a processor. For example, the machine learning model may include indications of the structure or weights of a neural network that can be simulated by the correction engine 230 based on the indications of the structure or weights. In some examples, the machine learning model 235 may include a neural network. The neural network may include a layer with a plurality of kernel sizes. The plurality of kernel sizes may allow for the neural network to detect and respond to features at a plurality of scales. The machine learning model 235 may be trained as discussed below to enhance fine details of the interpolated thermal image without distorting thermal values from portions of the interpolated thermal image without fine details.

The prediction engine 240 may compare the enhanced thermal image to a predicted thermal image. For example, the prediction engine 240 may perform a simulation to generate the predicted thermal image. The prediction engine 240 may generate a different predicted thermal image from the interpolation engine 220. For example, the prediction engine 240 may use a more complex model that considers the printing of previous layers to generate the predicted thermal image. The prediction engine 240 may compare the enhanced thermal image to the predicted thermal image to detect differences between the enhanced thermal image and the predicted thermal image. In some examples, the prediction engine 240 may modify the simulation based on the differences between the enhanced thermal image and the predicted thermal image or based on the enhanced thermal image alone.

The print process engine 250 may adjust a print parameter based on the comparison of the enhanced thermal image to the predicted thermal image. For example, the print process engine 250 may have determined an amount of energy or agent that should be delivered to the build material bed to form a second layer of the 3D object. However, the enhanced thermal image may indicate that the first layer was hotter or colder than expected by the print process engine 250. The print process engine 250 may adjust the amount of energy or agent to compensate for the first layer being hotter or colder than expected. The print process engine 250 may also, or instead, adjust the thickness of each layer of the build material, cancel printing of the 3D object or an adjacent 3D object, cancel the entire print job, or the like. The print engine 205 may cause the printer to form the second layer of the 3D object on the build material bed according to the adjusted print parameter.

In some examples, the system 200 may include a training engine 260 to train the machine learning model 235, e.g., if the example includes a machine learning model that starts untrained or if the machine learning model 235 is trained on an ongoing basis. The training engine 260 may update the machine learning model 235 based on the low-resolution thermal image to train the machine learning model to avoid distorting the thermal values. The training engine 260 may update the machine learning model 235 based on a high-resolution thermal image from the second camera 265 to train the machine learning model to enhance the fine details. Using the low-resolution thermal image and the high-resolution thermal image to train the machine learning model 235 may thus allow the correction engine 230 to enhance the fine details without distorting thermal values from the low-resolution thermal image or interpolated thermal image. Because the low-resolution and high-resolution thermal images are captured by separate cameras (and possibly different camera models), the thermal values from their respective images may vary for the same locations. Accordingly, training the machine learning model 235 based on the high-resolution thermal image without the low-resolution thermal image may cause the machine learning model 235 to distort thermal values of the low-resolution thermal image or interpolated thermal image based on the differences between the cameras. For example, under such a training regime, the machine learning model 235 may learn to "correct" thermal values by modifying them to more closely resemble what the second camera 265 might have captured, which could introduce undesirable errors into the images being enhanced.

The training engine 260 may calculate a loss function based on the low-resolution thermal image from the first camera and the high-resolution thermal image from the second camera. The loss function may be selected to balance the objectives of enhancing fine features and not distorting thermal values. The loss function may incorporate information from low-resolution thermal images and high-resolution thermal images during training to balance the objectives. The training engine 260 may update the machine learning model 235 based on the loss function. For example, the training engine 260 may use the output from the loss function to perform a gradient descent and may update weights of a neural network based on the gradient descent.

The training engine 260 may calculate the loss function based on a first comparison of thermal values of the enhanced thermal image to thermal values of the interpolated thermal image from the first camera and a second comparison of gradients of the enhanced thermal image to gradients of the high-resolution thermal image from the second camera. To perform the first comparison, the training engine 260 may compute an elementwise mean square error between the interpolated thermal image and the enhanced thermal image to produce a first error image that includes error values resulting from differences in thermal values at each location in the images. In some examples, the training engine 260 may not modify the interpolated thermal image or enhance image, for example by computing a gradient, prior to performing the comparison. In some examples, the training engine 260 may compare the enhanced thermal image to the low-resolution thermal image to compute the first error image. To perform the second comparison, the training engine 260 may generate a first gradient image from the enhanced thermal image and generate a second gradient image from the high-resolution thermal image by computing the gradient at each location in the image. The training engine 260 may compute an elementwise mean square error between the second gradient image and the first gradient image to produce a second error image that includes error values resulting differences in gradients at each location in the images. The training engine 260 may calculate gradients in both the x and y directions, and the training engine 260 may determine the mean square error for the gradients in both directions. The training engine 260 may combine the errors in the gradients in both directions to produce the second error image.

The training engine 260 may use a mask so that the first difference image or the second difference image includes values at unmasked locations but not at masked locations. In some examples, the training engine 260 may apply a mask to the enhanced thermal image and apply a mask to the interpolated thermal image. The training engine 260 may compare the masked enhanced thermal image to the masked interpolated thermal image to produce the first comparison. For example, the training engine 260 may generate the first difference image by performing an elementwise subtraction of the masked interpolated thermal image from the masked enhanced thermal image. In some examples, the training engine 260 may generate the first difference image by subtracting the masked interpolated thermal image from the masked enhanced thermal image and applying the mask to the result. The training engine 260 may also, or instead, apply a mask to the first and second gradient images or to the result from subtracting the second gradient image from the first gradient image.

The training engine 260 may generate the mask based on a shape image indicating locations of the build material bed to be fused for a layer of the build material bed corresponding to the low-resolution thermal image. The training engine 260 may determine the locations of edges or fine details in the enhanced thermal image based on the shape image and surrounding locations to generate the mask. For example, the training engine 260 perform a dilation and an erosion on the shape image to modify values of the shape image near edges and fine details. The training engine 260 may subtract the dilated and eroded shape image from the shape image (or vice versa) to produce the mask, which may include a value of one at locations not dilated and eroded and a value of zero at locations that were dilated and eroded. Alternatively, or in addition, the training engine 260 may generate a mask that includes a value of one at locations that were dilated and eroded and a value of zero at locations that were not dilated and eroded.

The training engine 260 may apply a first weight to the first comparison and a second weight to the second comparison. The training engine 260 may calculate the loss function based on the first comparison weighted with the first weight and the second comparison weighted by the second weight. In an example, the training engine 260 may multiply each element of the first error image by the first weight to generate a first weighted error image and each element of the second error image by the second weight to generate a second weighted error image. The training engine 260 may perform an elementwise addition of the weighted first error image and the weighted second error image to compute the loss function. The training engine 260 may perform backpropagation to update the machine learning model 235 based on the loss function.

FIG. 3 is a flow diagram of an example method 300 to interpolate and enhance thermal images. A processor may perform elements of the method 300. At block 302, the method 300 may include generating an interpolated thermal image based on a low-resolution thermal image from a first camera. Generating the interpolated thermal image may include upsampling an image and using interpolation to compute values for blank locations in the upsampled image. The interpolated thermal image may be generated directly from the low-resolution thermal image or based on an intermediate image computed based on the low-resolution thermal image.

At block 304, the method 300 may include enhancing the interpolated thermal image using a machine learning model to produce an enhanced thermal image. For example, enhancing the interpolated thermal image may include enhancing fine details of the interpolated thermal image to remove undesirable gradients and interpolation artifacts. The machine learning model may receive the interpolated thermal image as an input and output an enhanced thermal image having the same resolution.

At block 306, the method 300 may include calculating a loss function based on the low-resolution thermal image from the first camera and a high-resolution thermal image from a second camera. Calculating the loss function may include comparing the enhanced thermal image to the low-resolution thermal image or the high-resolution thermal image. The enhanced thermal image may be compared directly to the low-resolution thermal image and the high-resolution thermal image, or the compared images may be generated based on the enhanced thermal image, the low-resolution thermal image, or the high-resolution thermal image.

At block 308, the method 300 may include updating the machine learning model based on the loss function. For example, the machine learning model may be modified to produce more accurate results based on the value of the loss function. Referring to FIG. 2, in an example, the interpolation engine 220 may perform block 302, the correction engine 230 may perform block 304, and the training engine 260 may perform blocks 306 and 308.

Figure 4:
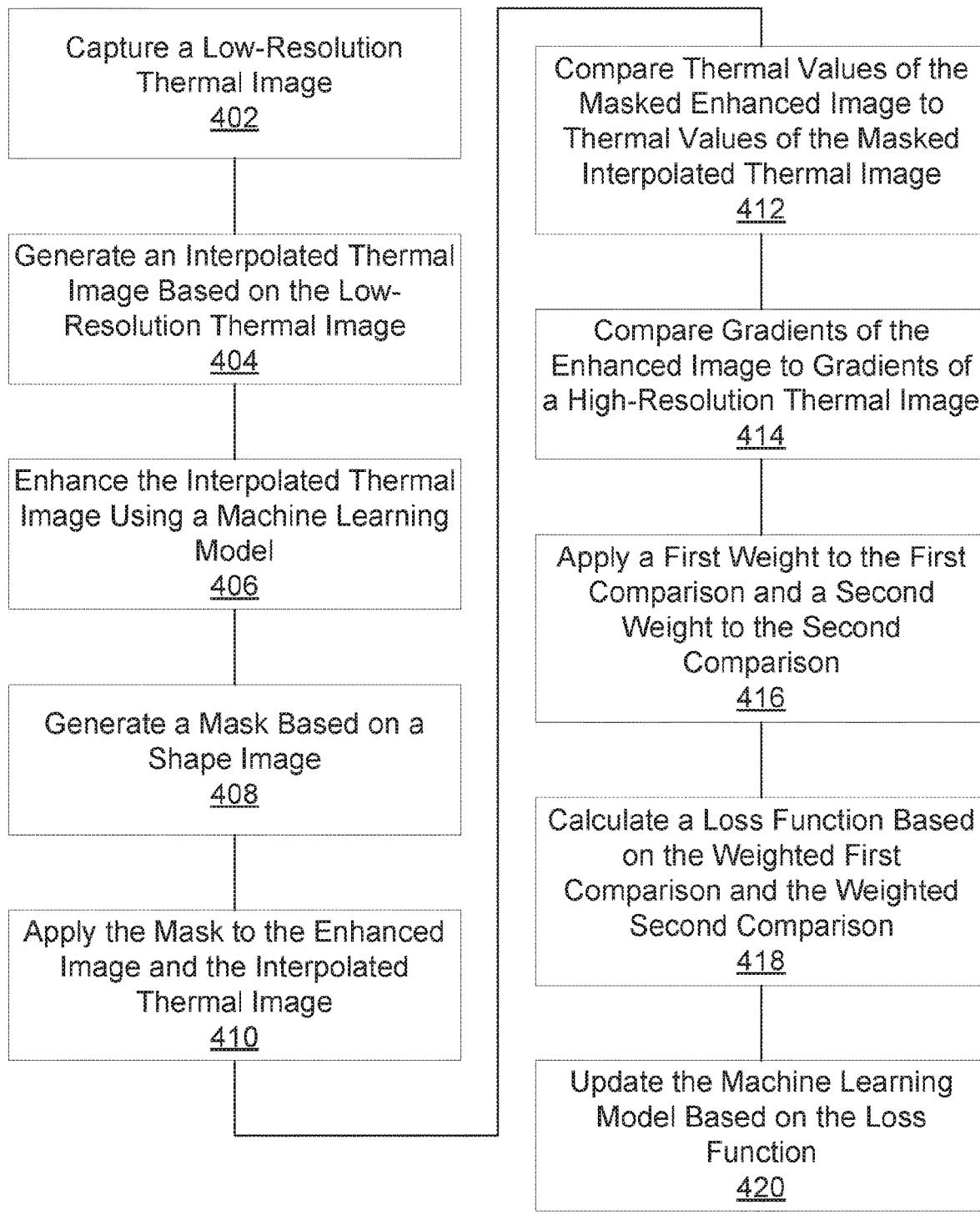
FIG. 4 is a flow diagram of another example method to interpolate and enhance thermal images.

FIG. 4 is a flow diagram of another example method 400 to interpolate and enhance thermal images. A processor may perform elements of the method 400. At block 402, the method 400 may include capturing a low-resolution thermal image with a first camera. In an example, the first camera may be a low-resolution camera included in a 3D printer and may capture an image of the build material bed of the 3D printer to produce the low-resolution thermal image.

At block 404, the method 400 may include generating an interpolated thermal image based on a low-resolution thermal image from a first camera. In some examples, a predicted thermal image predicted from a shape image may be downsampled and compared to the low-resolution thermal image to generate a ratio image. The ratio image may be upsampled and interpolated and multiplied by the predicted thermal image to generate the interpolated thermal image. In other examples, information from a predicted thermal image may be leveraged in other ways to assist with generating the interpolated thermal image based on the low-resolution thermal image and the predicted thermal image.

At block 406, the method 400 may include enhancing the interpolated thermal image using a machine learning model to produce an enhanced thermal image. The machine learning model may include a neural network. The interpolated thermal image may be input into the neural network implemented by the processor, which may produce the enhanced thermal image as an output. The neural network may remove undesirable gradients and interpolation artifacts near edges and fine details in the interpolated thermal image.

At block 408, the method 400 may include generating a mask based on a shape image indicating locations of the build material bed to be fused for a layer of the build material bed corresponding to the low-resolution thermal image. The shape image may be generated from a slice of a 3D model or a plurality of 3D models and may indicate which location of the build material bed should be fused to form a 3D object or a plurality of 3D objects corresponding to the 3D model or the plurality of 3D models. The mask may be generated based on edges or fine details in the shape image, for example, by using dilation or erosion select regions of the shape image near the edges or fine details. The mask may include a value of zero for regions near the edges or fine details and include a value of one for regions not near the edges or fine details. The mask may include a value of one for the regions near the edges or fine details and include a value of zero for regions not near the edges or fine details. In some examples, there may be two masks: one to mask regions near the edges and fine details, and one to mask regions not near the edges.

At block 410, the method 400 may include applying the mask to the enhanced thermal image and applying the mask to the interpolated thermal image. Applying the mask may include performing an elementwise multiplication of the mask by the image being masked (e.g., the enhanced thermal image, the interpolated thermal image, etc.). Applying the mask may zero regions of the images near the edges or fine details and leave other regions unchanged. In some examples, the gradient images discussed in connection with element 414 may be masked to zero regions of the gradient images not near the edges or fine details and to leave the regions near the edges and fine details unchanged.

At block 412, the method 400 may include comparing thermal values of the masked enhanced thermal image to thermal values of the masked interpolated thermal image. Comparing the thermal values may include computing a mean square error between corresponding pixels in the masked enhanced thermal image and the masked interpolated thermal image to produce a first error image. The mean square error may be computed based on comparing the thermal values of the pixels.

At block 414, the method 400 may include comparing gradients of the enhanced thermal image to gradients of a high-resolution thermal image from a second camera. For example, gradient images may be computed based on the enhanced thermal image and based on the high-resolution thermal image, and the gradient images may be compared to produce a second error image. There may be multiple gradient images per underlying image. For example, each gradient image may be generated by computing gradients in a different direction. Each gradient image for the enhanced thermal image may be compared to a corresponding gradient image for the high-resolution thermal image, and the results of the comparisons may be combined to produce the second error image. Comparing the gradient images may include computing the mean square error between the gradient values at corresponding locations in the gradient images.

At block 416, the method 400 may include applying a first weight to the first comparison and a second weight to the second comparison. The first weight and the second weight may be the same or may be different. The first and second weight may sum to a value of one. Applying the first weight to the first comparison may include multiplying the first weight by each element of the first error image, and applying the second weight to the second comparison may include multiplying the second weight by each element of the second error image.

At block 418, the method 400 may include calculating a loss function based on the first comparison weighted with the first weight and the second comparison weighted by the second weight. Calculating the loss function may include summing the first error image multiplied by the first weight with the second error image multiplied by the second weight to produce a final error image.

At block 420, the method 400 may include updating the machine learning model based on the loss function. The machine learning model may include a neural network. The error values of the final error image may be backpropagated through the neural network to update weights of each node of the neural network. In an example, the camera 210 of FIG. 2 may perform block 402, the interpolation engine 220 may perform block 404, the correction engine 230 may perform block 406, and the training engine 260 may perform blocks 408, 410, 412, 414, 416, 418, and 420.

Figure 5:
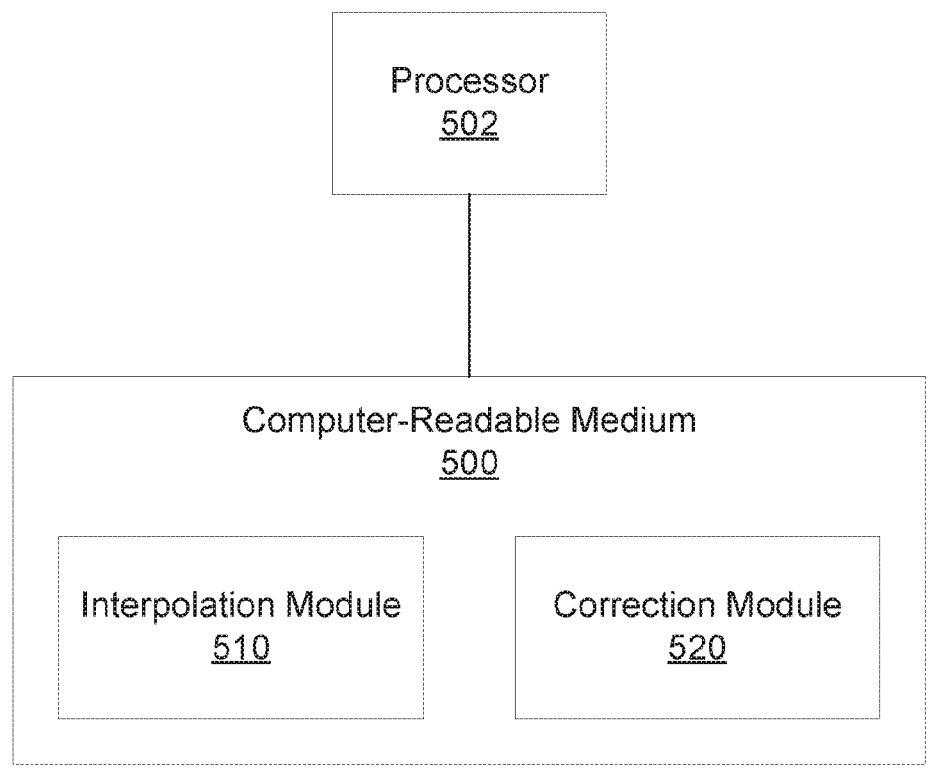
FIG. 5 is a block diagram of an example computer-readable medium including instructions that cause a processor to interpolate and enhance thermal images.

FIG. 5 is a block diagram of an example computer-readable medium 500 including instructions that, when executed by a processor 502, cause the processor 502 to interpolate and enhance thermal images. The computer-readable medium 500 may be a non-transitory computer-readable medium, such as a volatile computer-readable medium (e.g., volatile RAM, a processor cache, a processor register, etc.), a non-volatile computer-readable medium (e.g., a magnetic storage device, an optical storage device, a paper storage device, flash memory, read-only memory, non-volatile RAM, etc.), and/or the like. The processor 502 may be a general-purpose processor or special purpose logic, such as a microprocessor (e.g., a central processing unit, a graphics processing unit, etc.), a digital signal processor, a microcontroller, an ASIC, an FPGA, a programmable array logic (PAL), a programmable logic array (PLA), a programmable logic device (PLD), etc.

The computer-readable medium 500 may include an interpolation module 510 and a correction module 520. As used herein, a "module" (in some examples referred to as a "software module") is a set of instructions that when executed or interpreted by a processor or stored at a processor-readable medium realizes a component or performs a method. The interpolation module 510 may include instructions that, when executed, cause the processor 502 to generate an interpolated thermal image based on a low-resolution thermal image of a build material bed. The interpolation engine 510 may cause the processor 502 to generate the interpolated thermal image directly from the low-resolution thermal image or indirectly and may or may not include information from additional images.

The correction module 520 may cause the processor 502 to enhance fine details of the interpolated thermal image using a machine learning model to produce an enhanced thermal image. The machine learning model may be designed to enhance the fine details while maintaining accuracy of thermal values from part or powder centers. The correction module 520 may cause the processor 502 to execute instructions that implement the machine learning model and operate on the interpolated thermal image as an input to the machine learning model. The correction module 520 may cause the processor 502 to produce the enhanced thermal image as an output from the implemented machine learning model. In an example, when executed by the processor 502, the interpolation module 510 may realize the interpolation engine 120 of FIG. 1, and the correction module 520 may realize the correction engine 130.

Figure 6:
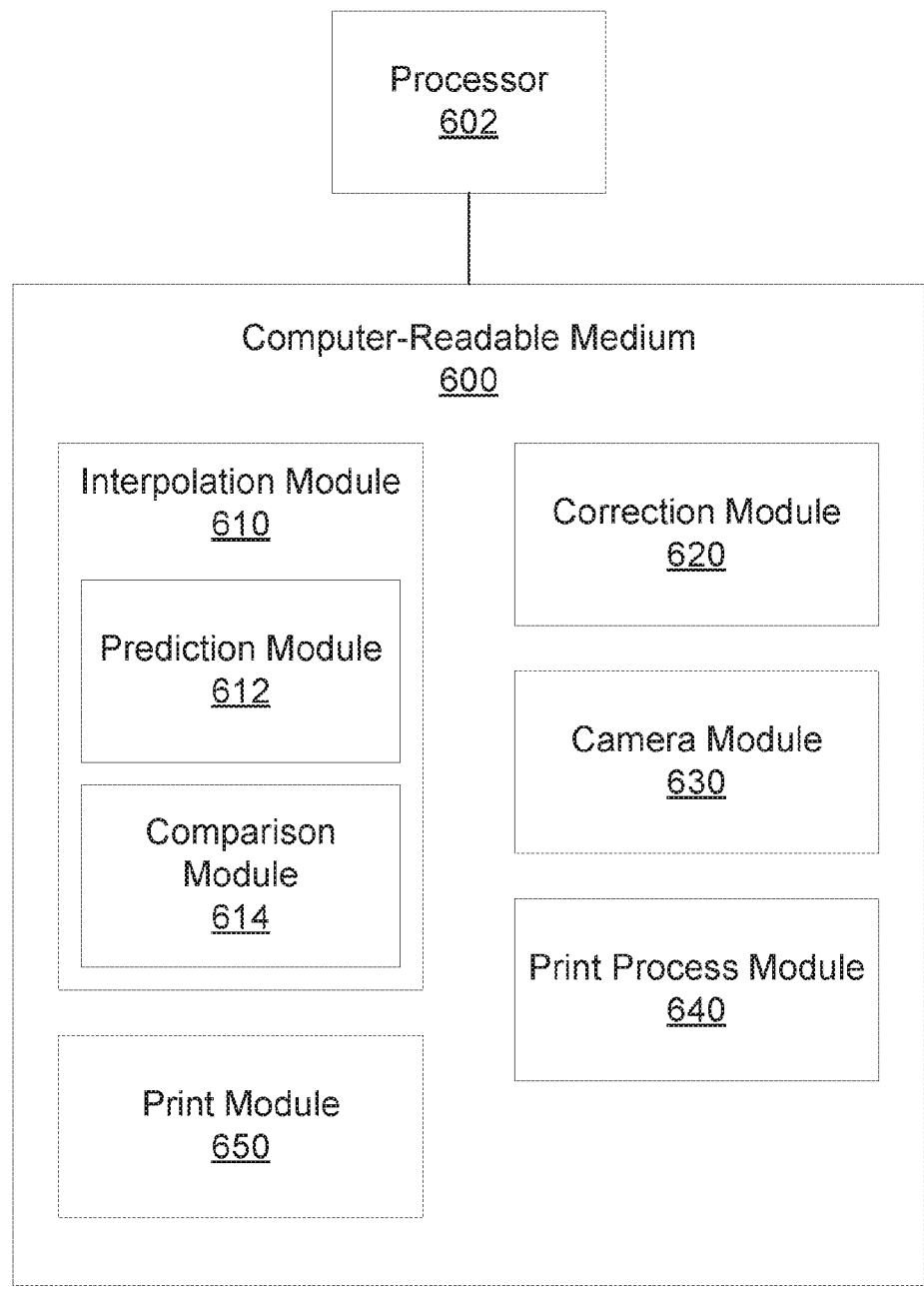
FIG. 6 is a block diagram of another example computer-readable medium including instructions that cause a processor to interpolate and enhance thermal images.

FIG. 6 is a block diagram of another example computer-readable medium 600 including instructions that, when executed by a processor 602, cause the processor 602 to interpolate and enhance thermal images. The computer-readable medium 600 may include an interpolation module 610, a prediction module 612, a comparison module 614, a correction module 620, a camera module 630, a print process module 640, and a print module 650.

The print module 650 may cause the processor 602 to cause a printer to form a first layer of a 3D object on a build material bed. The printer may include the computer-readable medium 600 and the processor 602, or they may be separate from the printer and may be communicatively coupled to the printer. The printer may add a layer of powder to the build material bed, apply an agent to the powder, or deliver energy to the layer of powder to form the first layer of the 3D object on the build material bed.

The camera module 630 may cause the processor 602 to cause the printer to capture a low-resolution thermal image of the build material bed. For example, the camera module 630 may cause the processor 602 to instruct a camera or to instruct the printer to instruct the camera to capture the low-resolution thermal image of the build material bed. The camera module 630 may cause the processor 602 to cause the camera to capture the image at any point during the formation of the first layer, such as after the addition of the layer powder, the application of the agent, and the delivery of the energy.

The interpolation module 610 may cause the processor 602 to generate an interpolated thermal image based on the low-resolution thermal image of the build material bed. The interpolation module 610 may include a prediction module 612 and a comparison module 614. The prediction module 612 may cause the processor 602 to generate a predicted thermal image based on a shape image. For example, the prediction module 612 may cause the processor 602 to use a simple, fast-to-compute model to generate the predicted thermal image from the shape image. The model may modify the shape image to account for heat diffusion.

The interpolation module 610 may cause the processor 602 to generate the interpolated thermal image based on the predicted thermal image. For example, the comparison module 614 may cause the processor 602 to downsample the predicted thermal image to produce a downsampled predicted thermal image. The comparison module 614 may cause the processor 602 to calculate a ratio image based on a ratio of the downsampled predicted thermal image to the low-resolution thermal image. For example, the comparison module 614 may cause the processor 602 to calculate the ratio image by performing an elementwise division of the downsampled predicted thermal image by the low-resolution thermal image. The interpolation module 610 may cause the processor 602 to interpolate the ratio image to produce an interpolated ratio image. In some examples, the interpolation module 610 may cause the processor 602 to compute a bicubic interpolation to generate the interpolated ratio image. The interpolation module 610 may cause the processor 602 to multiply the predicted thermal image by the interpolated ratio image to produce the interpolated thermal image. For example, the interpolation module 610 may cause the processor 602 to perform an elementwise multiplication of the predicted thermal image by the interpolated ratio image. In the illustrated example, the prediction module 612 causes the processor 602 to generate the predicted thermal image that is used for generating ratio and interpolated thermal images. In other examples, the interpolation module 610 and comparison module 614 may cause the processor to generate the ratio and interpolated thermal images from the shape image directly rather than from the predicted thermal image.

The correction module 620 may cause the processor 602 to enhance fine details of the interpolated thermal image using a machine learning model to produce an enhanced thermal image. The machine learning model may be designed to enhance the fine details while maintaining accuracy of thermal values from part or powder centers. The machine learning model may include a neural network that includes a layer with a plurality of kernel sizes. The neural network may have been trained as discussed above to enhance the fine details while maintaining accuracy of the thermal values from the part or powder centers.

The print process module 640 may cause the processor 602 to adjust a print parameter based on the enhanced thermal image. The print process module 640 may cause the processor 602 to determine from the enhanced thermal image whether the printer will fail to form the 3D object correctly. For example, the print process module 640 may cause the processor 602 to determine if any of the thermal values are outside of expected values. The expected values may be determined based on a simulation, based on the shape image or the predicted thermal image, or the like. Based on thermal values indicating the build material bed is too hot or too cold, the print process module 640 may cause the processor 602 to determine that the amount of agent or energy delivered to the build material bed should be decreased or increased for a future layer. The print process module 640 may also, or instead, determine that a layer thickness should be increased or decreased.

The print module 650 may cause the processor 602 to cause the printer to form a second layer of the 3D object on the build material bed according to the adjusted print parameter. For example, the print module 650 may cause the processor 602 to instruct the printer or components of the printer to form the second layer according to the adjusted print parameters. The print module 650 may cause the processor 602 to cause the printer to increase or decrease a layer thickness, an amount of agent delivered to build material bed, an amount of energy delivered to the build material bed, or the like. Referring to FIG. 2, in an example, when executed by the processor 602, the interpolation module 610, the prediction module 612, or the comparison module 614 may realize the interpolation engine 220, the correction module 620 may realize the correction engine 230, the camera module 620 may realize the print engine 205 or the camera 210, the print process module 640 may realize the prediction engine 240 or the print process engine 250, and the print module 650 may realize the print engine 205.

The above description is illustrative of various principles and implementations of the present disclosure. Numerous variations and modifications to the examples described herein are envisioned. Accordingly, the scope of the present application should be determined only by the following claims.

What is claimed is:

1. A three-dimensional printer comprising:
a first camera to capture a low-resolution thermal image of a build material bed;
an interpolation engine to generate an interpolated thermal image based on the low-resolution thermal image; and
a correction engine to enhance fine details and remove undesirable gradients and interpolation artifacts of the interpolated thermal image without distorting thermal values from portions of the interpolated thermal image without fine details to produce an enhanced thermal image, wherein the correction engine enhances the fine details and removes undesirable gradients and interpolation artifacts using a machine learning model trained to enhance the fine details without distorting the other portions of the interpolated thermal image, and wherein the machine learning model is trained using a high-resolution thermal image from a second camera.

2. The three-dimensional printer of claim 1, further comprising a training engine to update the machine learning model based on the low-resolution thermal image to train the machine learning model to avoid distorting the thermal values and based on a high-resolution thermal image from the second camera to train the machine learning model to enhance the fine details.

3. The three-dimensional printer of claim 1, further comprising a prediction engine to compare the enhanced thermal image to a predicted thermal image, and a print process engine to adjust a print parameter based on the comparison of the enhanced thermal image to the predicted thermal image.

4. The three-dimensional printer of claim 1, wherein the interpolation engine is to receive a shape image and generate the interpolated thermal image based on the low-resolution thermal image and the shape image.

5. A method, comprising:
generating an interpolated thermal image based on a low-resolution thermal image from a first camera;
enhancing the interpolated thermal image using a machine learning model to produce an enhanced thermal image, wherein enhancing the interpolated thermal image includes enhancing fine details of the interpolated thermal image and removing undesirable gradients and interpolation artifacts;
calculating a loss function based on the low-resolution thermal image from the first camera and a high-resolution thermal image from a second camera; and
updating the machine learning model based on the loss function.

6. The method of claim 5, wherein calculating the loss function comprises calculating the loss function based on a first comparison of thermal values of the enhanced thermal image to thermal values of the interpolated thermal image from the first camera and a second comparison of gradients of the enhanced thermal image to gradients of the high-resolution thermal image from the second camera.

7. The method of claim 6, further comprising applying a mask to the enhanced thermal image, applying a mask to the interpolated thermal image, and comparing the masked enhanced thermal image to the masked interpolated thermal image to produce the first comparison.

8. The method of claim 7, further comprising generating the mask based on a shape image indicating locations of a build material bed to be fused for a layer of the build material bed corresponding to the low-resolution thermal image.

9. The method of claim 6, wherein calculating the loss function comprises applying a first weight to the first comparison and a second weight to the second comparison and calculating the loss function based on the first comparison weighted with the first weight and the second comparison weighted by the second weight.

10. A non-transitory computer-readable medium comprising instructions that, when executed by a processor, cause the processor to:
generate an interpolated thermal image based on a low-resolution thermal image of a build material bed; and
enhance fine details of the interpolated thermal image using a machine learning model to produce an enhanced thermal image, the machine learning model designed to enhance the fine details and remove undesirable gradients and interpolation artifacts while maintaining accuracy of thermal values from part or powder centers, wherein the machine learning model is trained using a high-resolution thermal image.

11. The computer-readable medium of claim 10, further comprising instructions that cause the processor to cause a printer to form a first layer of a three-dimensional object on the build material bed, cause the printer to capture the low-resolution thermal image, adjust a print parameter based on the enhanced thermal image, and cause the printer to form a second layer of the three-dimensional object on the build material bed according to the adjusted print parameter.

12. The computer-readable medium of claim 10, wherein the machine learning model comprises a neural network including a layer with a plurality of kernel sizes.

13. The computer-readable medium of claim 10, further comprising instructions that cause the processor to generate a predicted thermal image based on a shape image, wherein the instructions to generate the interpolated thermal image include instructions that cause the processor to generate the interpolated thermal image based on the predicted thermal image.

14. The computer-readable medium of claim 13, wherein the instructions to generate the interpolated thermal image include instructions that cause the processor to downsample the predicted thermal image to produce a downsampled predicted thermal image, calculate a ratio image based on a ratio of the downsampled predicted thermal image to the low-resolution thermal image, interpolate the ratio image to produce an interpolated ratio image, and multiply the predicted thermal image by the interpolated ratio image to produce the interpolated thermal image.

* * * * *